(12) United States Patent
Martinez et al.

(10) Patent No.: US 8,932,490 B2
(45) Date of Patent: Jan. 13, 2015

(54) ANTI-CAKING COMPOSITIONS FOR FERTILIZERS

(75) Inventors: Joan Antoni Riaza Martinez, Palamós-Girona (ES); Marc Rocafull Fajardo, Terrassa-Barcelona (ES)

(73) Assignee: Kao Corporation, S.A., Barbera del Valles-Barcelona (ES)

( * ) Notice: Subject to any disclaimer, the term of this patent is extended or adjusted under 35 U.S.C. 154(b) by 1085 days.

(21) Appl. No.: 12/452,344

(22) PCT Filed: Jul. 2, 2008

(86) PCT No.: PCT/EP2008/058496
§ 371 (c)(1),
(2), (4) Date: Apr. 15, 2010

(87) PCT Pub. No.: WO2009/004024
PCT Pub. Date: Jan. 8, 2009

(65) Prior Publication Data
US 2010/0192653 A1      Aug. 5, 2010

(30) Foreign Application Priority Data
Jul. 3, 2007   (ES) .................................. 200701876

(51) Int. Cl.
*B01J 2/30*        (2006.01)
*C05G 3/00*      (2006.01)

(52) U.S. Cl.
CPC ................. *C05G 3/0041* (2013.01); *B01J 2/30* (2013.01); *C05G 3/0088* (2013.01)
USPC .......... 252/381; 252/383; 252/384; 71/64.12; 562/8; 562/23

(58) Field of Classification Search
CPC .......... B01J 2/30; C05G 3/0088; C07F 9/301; C07F 9/3808
USPC ......... 252/381, 383, 384; 71/64.12; 562/8, 23
See application file for complete search history.

(56) References Cited

U.S. PATENT DOCUMENTS

| | | | |
|---|---|---|---|
| 3,926,841 A | 12/1975 | Habasko et al. | |
| 4,150,965 A | 4/1979 | Van Hijfte et al. | |
| 4,978,791 A | 12/1990 | Volker et al. | |
| 4,983,455 A * | 1/1991 | Wakai et al. | 428/336 |
| 5,203,906 A | 4/1993 | Schapira et al. | |
| 5,364,440 A | 11/1994 | Schapira et al. | |
| 5,626,660 A | 5/1997 | Lautenschlager et al. | |
| 5,698,005 A | 12/1997 | Schapira et al. | |
| 5,968,222 A | 10/1999 | Kodali | |
| 7,108,800 B2 | 9/2006 | Tran et al. | |
| 2002/0072973 A1 | 6/2002 | Magoshi | |
| 2002/0139158 A1 | 10/2002 | Hunter | |
| 2004/0069032 A1 | 4/2004 | Krysiak et al. | |
| 2006/0284137 A1 | 12/2006 | Tran et al. | |

FOREIGN PATENT DOCUMENTS

| | | | |
|---|---|---|---|
| EP | 0113687 | | 7/1984 |
| EP | 0389331 | | 9/1990 |
| EP | 0692468 | | 1/1996 |
| EP | 0960082 | | 8/1998 |
| EP | 0858439 | | 1/2002 |
| ES | 2121694 | | 12/1998 |
| ES | 2164406 | | 2/2002 |
| GB | 742636 | | 12/1953 |
| GB | 1354376 | | 5/1974 |
| GB | 1383444 | | 2/1975 |
| GB | 1312314 | | 4/1976 |
| GB | 1479455 | | 7/1997 |
| JP | 57095938 A | * | 6/1982 |
| JP | 58009219 A | * | 1/1983 |
| WO | 02100799 | | 12/2002 |

OTHER PUBLICATIONS

English abstract of Koga et al., JP57095938A, Jun. 1982.*
Derwent English abstract of Munekiyo et al., JP 5800219 A, (1983).*
International Search Report issued by the International Searching Authority (ISA/O.E.P.M.) on Oct. 12, 2008 in connection with International Application No. PCT/EP2008/058496.

* cited by examiner

*Primary Examiner* — Peter F Godenschwager
(74) *Attorney, Agent, or Firm* — Gary J. Gershik; Cooper & Dunham LLP

(57) ABSTRACT

The invention relates to novel compositions for preventing caking and crust formation in several types of manures or fertilizers in the form of granular solids. Said compositions comprise at least one phosphoric ester and at least one fatty trialkylamine of formula (III)

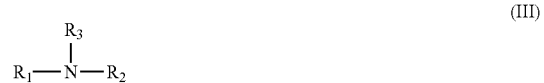

(III)

wherein
$R_1$ represents a linear or branched alkyl, alkenyl or alkynyl group containing between 6 and 24 carbon atoms,
$R_2$ represents an alkyl group containing between 1 and 5 carbon atoms,
$R_3$ represents a linear or branched alkyl group containing between 1 and 5 carbon atoms, or alkyl, alkenyl or alkynyl group containing between 6 and 24 carbon atoms.

15 Claims, No Drawings

ANTI-CAKING COMPOSITIONS FOR FERTILIZERS

FIELD OF THE INVENTION

The present invention relates to compositions used for preventing caking and crust formation in several types of manures or fertilizers in the form of granular solids.

STATE OF THE ART

At least two general types of fertilizers in the form of granular solids are currently used:

1) so-called simple fertilizers, among which the most used are different potassium, phosphorus or nitrogen compounds assimilable by plants, for example, potassium chloride (KCl), ammonium (AN), potassium (KN) and calcium (CN) nitrates, mono- and diammonium sulfates and urea-based fertilizers;

2) complex fertilizers based on their overall content of nitrogen, phosphorus and potassium, which are usually called NPK, and which are different from one another mainly due to their nitrogen, phosphorus and potassium content, expressed as the percentage of nitrogen (N), phosphoric anhydride ($P_2O_5$) and potassium oxide ($K_2O$) which the complex fertilizer contains.

Most of these fertilizers, which when recently manufactured have the appearance of granular masses with good flowability and homogeneity, due to the nature of the salts which they contain, show a clear tendency for caking (a phenomenon consisting of the coalescence of fertilizer particles or granules, forming masses that are more or less difficult to separate), which increases insofar as the storage and transport conditions thereof involve their exposure to relatively high temperature, humidity and pressure conditions. The caking and crust formation of fertilizers causes serious problems at the time of their dosing and application.

Another frequent problem observed during the formation of fertilizers in granular form is the formation of dust, fertilizer particles that are fine enough to become dust transported by the air. This dust is produced during the manufacture, the storage and the transport of the fertilizer particles. The formation of the dust can be the result of the mechanical abrasion caused during the movement of the fertilizer particles, continuous chemical reactions or curing processes after the initial formation of the particle, the migration action of moisture through the fertilizer during the storage, or as a result of environmental temperature and humidity.

The diffusion of the fertilizer dust causes safety, health, environmental, domestic economy and maintenance problems for the producers, distributors and consumers of the fertilizer. For example, the fertilizer dust causes human health risks due to the inhalation thereof. Another problem associated to the fertilizer dust transported by the air is the loss of agronomic and economic value, whereas it potentially contributes to the pollution of surface water ecosystems.

One of the most used solutions to solve the mentioned problems consists of subjecting the recently manufactured fertilizer, or after a curing period in the warehouse, to a coating treatment with fluid compositions at the application temperature, which quickly solidify or acquire sufficient viscosity in contact with the granules.

Spanish patent application ES-A-2121694 of the applicant describes anti-caking compositions for granular fertilizers based on the joint use of mineral oils, primary fatty amines (monoalkylamines in which the alkyl group is of fatty origin) and alkyl phosphoric esters.

Spanish patent application ES-A-2179781, also of the applicant, describes compositions which can prevent the caking and the humectation of nitrogenous fertilizers at the same time. Said additives do not contain fatty amines or their salts and contain paraffins, paraffin oil and $C_2$-$C_{22}$ alkyl or $C_2$-$C_{12}$ alkylaryl phosphoric monoesters and/or diesters, possibly alkoxylated. Said phosphoric esters can be totally or partially neutralized with a $C_1$-$C_4$ amine of the monoalkylamine, dialkylamine, trialkylamine, monohydroxyalkylamine, dihydroxyalkylamine or trihydroxyalkylamine type.

The description of the mentioned patent applications includes a broad exposition of the state of the art relating to anti-caking compositions for fertilizers, including specific references to relevant documents. Said descriptions are incorporated herein by way of reference for the state of the art on the mentioned anti-caking compositions.

U.S. Pat. No. 3,926,841 describes a composition for reducing the caking of fertilizer particles, comprising:

a) 1-20% by weight of a cationic aliphatic amine selected from amines of formula $RR_1R_2N$ and $RNHCH_2CH_2CH_2NH_2$, wherein R is an aliphatic hydrocarbon radical with 8 to 22 carbon atoms, $R_1$ and $R_2$ are selected from H and alkyl groups with 1 to 22 carbon atoms, b) 3-80% by weight of a carboxylic acid selected from aliphatic and cycloaliphatic carboxylic acids with 8 to 22 carbon atoms, c) 0.1-5% by weight of an alkali selected from short-chain alkanolamines in which the alkanol unit has from 2 to 4 carbon atoms and hydroxides selected from magnesium hydroxide, zinc hydroxide, nickel hydroxide and aluminium hydroxide, and d) up to 90% by weight of an inert organic solvent selected from mineral oils, waxes, polyethylene glycols and mixtures thereof.

Although the formula $RR_1R_2N$ includes monoalkylamines, dialkylamines and trialkylamines, according to U.S. Pat. No. 3,926,841 the preferred amines are mixtures of saturated and unsaturated n-aliphatic amines with 12 to 20 carbon atoms (stearylamine, oleylamine or tallow amine)

European patent application EP-A-0113687 describes ammonium nitrate granules coated with a composition consisting of a homogeneous mixture of the following essential components:

a) 5-30% of a product obtained by the neutralization of $C_{12}$-$C_{20}$ fatty monoalkylamines, optionally alkoxylated, with phosphate esters corresponding to a very broad general formula within which alkyl phosphate esters the chain length of which is comprised between $C_4$ and $C_{12}$ are possible, b) 25-70% of a mineral oil, which can be of the aromatic type, c) 10-25% of a coarsely-crystalline paraffin wax, and d) 5-25% of a microcrystalline paraffin wax.

European patent application EP-A-0341102 proposes the use of mixtures of fatty amine salts with $C_8$-$C_{20}$ acid phosphate esters, and with alkylarylsulfonic acids. The fatty amines can be alkylamines, cycloalkylamines, aromatic amines and alkanolamines, optionally alkoxylated. Said amines can be primary, secondary or tertiary, $C_{12}$-$C_{20}$ fatty monoalkylamines, such as technical-grade stearylamine or hydrogenated tallow alkylamine, being preferred.

European patent application EP-A-0715884 describes granular fertilizers which have been coated by a composition comprising $C_{12}$-$C_{20}$ dialkylamines ($R_2NH$) and $C_{12}$-$C_{20}$ monoalkylamines ($RNH_2$), in which the content by weight of monoalkylamine is equal to or less than 75%. Said composition for coating the granular fertilizers can further contain oils, waxes, inorganic powders or anionic surfactants. As indicated in European patent application EP-A-0715884, dialkylamines have been studied as anti-caking agents and for preventing the formation of dust, as described in FR-A-2062452. However, dialkylamines on their own are not sufficiently efficient compared to the commonly used monoalkylamine, stearylamine.

In addition, patent application FR-A-2062452 describes granular fertilizers coated by a composition comprising at least 70% by weight of polyethylene with a molecular weight between 500 and 10000, in addition to aliphatic primary amines (monoalkylamines) with 6 to 24 carbon atoms and/or aliphatic secondary amines (dialkylamines) with 12 to 48 carbon atoms and/or aliphatic tertiary amines (trialkylamines) with 12 to 60 carbon atoms and/or one or more ethylene oxide-propylene oxide copolymers with a molecular weight between 1800 and 10000 and containing between 10-80% by weight of ethylene oxide units. Suitable amines according to patent application FR-A-2062452 are stearylamine, cetylamine, mono-isotridecylamine, mono-isononylamine, n-propyl-isononylamine, dimethyl isotridecylamine, di-isotridecylamine and tri-isotridecylamine. However, in the examples of the mentioned patent application it is observed that the efficiency of trialkylamines is clearly lower than that of monoalkylamines, and more specifically than that of stearylamine.

From the extensive state of the art set forth above, it is clearly deduced that the problem of the anti-caking treatment of granular fertilizers is complex and is far from being considered completely solved. In fact, it is observed that more complex and sophisticated solutions are increasingly proposed, which is not very suitable for products such as fertilizers which need more efficient, simple and economic alternative solutions due to their high consumption and low price.

The inventors have developed certain compositions of phosphoric esters and fatty trialkylamines which not only confer anti-caking characteristics to granular fertilizers equivalent to those provided by compositions based on phosphoric esters and fatty monoalkylamines such as stearylamine, but which also, since they have a lower melting point facilitating their application on the fertilizer, require using less energy when applying them on the fertilizer, as said application is normally carried out by spraying, therefore said compositions must be in fluid form. This energy saving is beneficial not only from the economic point of view, but also from the environmental point of view.

SUMMARY OF THE INVENTION

As a result, the main object of the present invention are compositions for preventing the caking of fertilizers in the form of granular solids with an optimal anti-caking capacity and a suitable melting point, said compositions comprising at least one phosphoric ester and at least one fatty trialkylamine.

Another object of the present invention are fertilizer compositions in the form of granular solids resistant to caking characterized in that the granular solids are coated by a composition comprising at least one phosphoric ester and at least one fatty trialkylamine.

Another additional object of the present invention consists of the use of the mentioned compositions for preventing the caking of fertilizers in the form of granular solids.

Finally, another object of the present invention is a method for obtaining fertilizers in the form of granular solids based on the application of the mentioned compositions on the surface of the fertilizer granules.

DETAILED DESCRIPTION OF THE INVENTION

Phosphoric Esters

Phosphoric esters are products well known in the art. They are usually obtained from the reaction between alcohols with phosphorus pentoxide, and both the obtained products and the mentioned reaction are known, more detailed information on them being able to be found in the article published by O'Lenick et al., in Soap Cosmetics and Chemical Specialties, July 1986, page 26.

Thus, suitable phosphoric esters for the object of the invention are products well known by the person skilled in the art, which are obtained by means of the reaction of $C_6$-$C_{24}$ fatty alcohols or $C_2$-$C_{12}$ alkylphenols with phosphorus pentoxide, and can possibly be alkoxylated by the reaction with 1-50 moles of an alkylene oxide, mainly ethylene oxide and/or propylene oxide.

The obtained products are a mixture of monoesters and diesters, the phosphoric esters of formula (I) and (II) being preferred

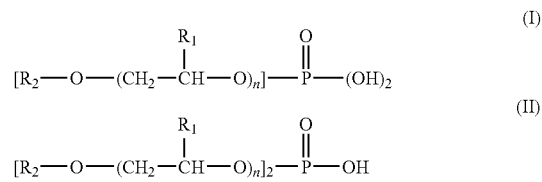

wherein, $R_1$ represents H, $CH_3$ or $C_2H_5$, $R_2$ represents a linear or branched alkyl, alkenyl or alkynyl group containing between 6, and 24 carbon atoms, and n represents a number comprised between 0 and 15, preferably between 0 and 10, or mixtures thereof.

For the purposes of the present invention, the products in which the molar ratio of monoester (phosphoric esters of formula (I)) to diester (phosphoric esters of formula (II)) is comprised between 90:10 and 30:70, more preferably between 85:15 and 50:50 are preferred, those in which the molar ratio of monoester to diester is comprised between 70:30 and 55:45 being especially preferred.

Phosphoric esters in which $R_2$ represents a non-alkoxylated linear or branched $C_6$-$C_{24}$ alkyl, alkenyl or alkynyl group (n represents 0) are preferred, phosphoric esters in which $R_2$ represents a non-alkoxylated linear or branched alkyl, alkenyl or alkynyl group containing between 10 and 18 carbon atoms (n represents 0) being especially preferred.

Examples of commercially available phosphoric esters are those corresponding to the commercial reference FOSFODET® 1214/50 (coconut phosphoric ester with a 55:45 molar ratio of monoester to diester), FOSFODET® 8050 (hydrogenated tallow phosphoric ester with a 60:40 molar ratio of monoester to diester) and FOSFODET® FJZ 903 (ethoxylated oleic alcohol phosphoric ester with 3 moles of ethylene oxide with a 55:45 molar ratio of monoester to diester), marketed by KAO Chemicals Europe.

Fatty Trialkylamines

Fatty trialkylamines can be obtained by reacting fatty alcohols with $NH_3$, with alkylamines ($RNH_2$) or with dialkylamines ($RR'NH$), the suitable pressure, temperature conditions and catalysts being well known for the person skilled in the art, as described in the patent applications EP-A-EP0500038 or EP-A-0908444.

Examples of fatty alcohols which react to obtain trialkylamines are those from animal and vegetable fats and oils, such as cotton, safflower, coconut, rapeseed, linseed, palm, palm kernel, sunflower, olein, olive, olive pomace, castor oil, tallow, soy, tall oil, etc, possibly totally or partially hydrogenated, as well as purified or synthetic fatty acids such as caproic acid, caprylic acid, capric acid, lauric acid, myristic acid, palmitic acid, palmitoleic acid, stearic acid, isostearic acid, 2-ethylhexanoic acid, oleic acid, ricinoleic acid, elaidic acid, petroselinic acid, linoleic acid, linolenic acid, arachidic acid, gadoleic acid, behenic acid and erucic acid, or mixtures thereof.

Suitable fatty trialkylamines according to the invention correspond to the formula (III)

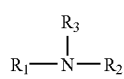
(III)

wherein
 $R_1$ represents a linear or branched alkyl, alkenyl or alkynyl group containing between 6 and 24 carbon atoms, preferably between 10 and 18 carbon atoms,
 $R_2$ represents a linear or branched alkyl group containing between 1 and 5 carbon atoms, preferably a methyl group,
 $R_3$ represents a linear or branched alkyl group containing between 1 and 5 carbon atoms, preferably a methyl group, or alkyl, alkenyl or alkynyl group containing between 6 and 24 carbon atoms, preferably between 10 and 18 carbon atoms,
 or mixtures thereof.

Suitable fatty trialkylamines according to formula (III) according to the invention are dimethyl octylamine, dimethyl decylamine, dimethyl laurylamine, dimethyl myristylamine, dimethyl palmitylamine, dimethyl cetylamine, dimethyl stearylamine, dimethyl behenylamine, coconut dimethylalkylamine, oleic dimethylalkylamine, tallow dimethylalkylamine, totally or partially hydrogenated tallow dimethylalkylamine, or mixtures thereof.

Other suitable fatty trialkylamines according to formula (III) according to the present invention are methyldioctylamine, methyldidecylamine, methyldilaurylamine, methyldimyristylamine, methyldipalmitylamine, methyldicetylamine, methyldistearylamine, methyldibehenylamine, coconut methyldialkylamine, oleic methyldialkylamine, tallow methyldialkylamine, totally or partially hydrogenated tallow methyldialkylamine, or mixtures thereof.

Examples of commercially available fatty trialkylamines are those corresponding to the commercial reference FARMIN® DM-2098 (dimethyl laurylamine), FARMIN® DM-4098 (dimethyl myristylamine), FARMIN® DM-6098 (dimethyl cetylamine), FARMIN® DM-8098 (dimethyl stearylamine), FARMIN® DM-2471 (coconut dimethylalkylamine), FARMIN® DM-O (oleic dimethylalkylamine), FARMIN® DM-T (tallow dimethylalkylamine), FARMIN® DM-TH (hydrogenated tallow dimethylalkylamine), FARMIN® M-D10 (methyldidecylamine), FARMIN® M-2TH (hydrogenated tallow methyldialkylamine), all of them marketed by KAO Chemicals Europe.

Anti-Caking Compositions

Preferred compositions for preventing caking and crust formation in fertilizers in the form of granular solids are those comprising, in the indicated amounts expressed as percentage by weight, a) 30-90%, preferably 50-80% of at least one phosphoric ester such as those previously described, and
b) 70-10%, preferably 50-20% of at least one fatty trialkylamine such as those previously described.

The phosphoric ester (component (a)) can have its acidic proton (in the case of the phosphoric ester of formula (II)) or its acidic protons (in the case of the phosphoric ester of formula (I)) partially or totally neutralized by the fatty trialkylamine (component (b)). Said neutralization reaction is followed by means of determining the acidity degree or index (AI), which is an indicator of the amount of free acids present in a sample, and which is expressed as the number of milligrams of potassium hydroxide (KOH) necessary for neutralizing the free acids in 1 gram of sample.

It is especially preferred that the phosphoric ester (component (a)) has its acidic proton or protons partially neutralized by the fatty trialkylamine (component (b)).

Although it is not strictly necessary, the use of an inert solvent (component (c)), which does not react with the components (a) or (b)) for diluting the anti-caking compositions is convenient.

Preferred compositions are those comprising, in the indicated amounts expressed as percentage by weight with respect to the total weight of the composition, a) 1-20%, preferably 5-15%, of at least one phosphoric ester such as those previously described,
b) 1-20%, preferably 3-15%, of at least one trialkylamine such as those previously described, and
c) 60-98%, preferably 70-92%, of an inert solvent.

Suitable inert solvents are mineral oils, paraffins and waxes from petroleum, animal and vegetable fats and oils, fatty acids, natural waxes and polyols, or mixtures thereof.

Suitable mineral oils, paraffins and waxes from petroleum according to the present invention are:

aromatic oils, which are a mixture of mineral oils from petroleum with a high content of components having aromatic type rings, white mineral oils, which are highly refined petroleum derivatives, generally used as carriers, excipients and lubricants in different industrial applications, paraffin oils, which are petroleum derivatives rich in paraffin components and have low density and a variable viscosity, macrocrystalline paraffins, which are petroleum derivatives containing mainly linear carbon chains with a molecular weight comprised between 250 and 500 and, although they are solids at room temperature, they have low melting points, usually comprised between 40° C. and 70° C., microcrystalline paraffins, which are petroleum derivatives and are mainly saturated hydrocarbons in which linear chains with short branches (isoparaffins) are predominant. They usually have mean molecular weights comprised between 500 and 800, and are solids at room temperature, having melting points comprised between 70° C. and 100° C.

Suitable animal or vegetable fats and oils according to the present invention are esters of linear and/or branched, saturated and/or unsaturated alkanecarboxylic acids with a chain length of 1 up to 30 carbon atoms and linear and/or branched, saturated and/or unsaturated alcohols with a chain length of 1 up to 30 carbon atoms, of the group of esters of aromatic carboxylic acids and linear and/or branched, saturated and/or unsaturated alcohols with a chain length of 1 up to 30 carbon atoms. These oils can be advantageously selected from the group consisting of isopropyl myristate, isopropyl palmitate, isopropyl stearate, isopropyl oleate, n-butyl stearate, n-hexyl laurate, n-decyl oleate, isooctyl stearate, isononyl stearate, isononyl isononanoate, 2-ethylhexyl laurate, 2-ethylhexyl palmitate, 2-ethylhexyl cocoate, 2-hexyldecyl stearate, 2-ethylhexyl isostearate, 2-octyldodecyl palmitate, cetyl palmitate, oleyl oleate, oleyl erucate, erucyl oleate, erucyl erucate, as well as synthetic, semisynthetic and natural mixtures of such esters, such as jojoba oil (a natural mixture of esters of monounsaturated monocarboxylic acids with a $C_{18}$-$C_{24}$ chain with also monounsaturated monoalcohols and with a long $C_{18}$-$C_{24}$ chain). Other suitable oils of the type of esters of saturated alkanecarboxylic acids and alcohols are fatty acid methyl esters, preferably $C_6$-$C_{24}$ fatty acid methyl esters from animal and vegetable fats and oils such as cotton, safflower, coconut, rapeseed, linseed, palm, palm kernel, sunflower, olein, olive, olive pomace, castor oil, tallow, soy, tall oil, etc, possibly totally or partially hydrogenated, as well as purified or synthetic fatty acids such as caproic acid, caprylic acid, capric acid, lauric acid, myristic acid, palmitic acid, palmitoleic acid, stearic acid, isostearic acid, 2-ethylhexanoic acid, oleic acid, ricinoleic acid, elaidic acid, petroselinic acid, linoleic acid, linolenic acid, arachidic acid, gadoleic acid, behenic acid and erucic acid, or mixtures thereof.

Other suitable animal or vegetable fats and oils according to the present invention are fatty acid triglycerides, specifically triglycerin esters of linear and/or branched, saturated and/or unsaturated alkanecarboxylic acids with a chain length of 6 up to 24 carbon atoms, preferably of 10 up to 18 carbon atoms. The fatty acids esterifying the different positions of glycerin can be different, giving rise to a large amount of possible combinations, including positional combinations. The position of the different fatty acids in natural triglycerides is not random, but rather it depends on the origin of the fat. The triglycerides more simple are those constituted by a sole fatty acid.

Fatty acid triglycerides can be advantageously chosen, for example, from the group consisting of synthetic, semi-synthetic and natural oils, as for example, animal fats and oils such as cow tallow, pig lard, bone oil, aquatic animal fats and oils (fish, such as herring, cod or sardine; cetaceans; etc.); and vegetable fats and oils such as avocado oil, almond oil, hazelnut oil, babassu palm oil, borage oil, peanut oil, canola oil, hemp oil, milk thistle oil, safflower oil, chufa oil, coconut oil, rapeseed oil, black cumin oil, wheat germ oil, sunflower oil, linseed oil, macadamia nut oil, corn oil, walnut oil, olive oil and its by-products such as olive pomace oil, palm oil and its fractions such as palm olein and palm stearin, evening primrose oil, rosehip oil, castor oil, rice bran oil, apricot kernel oil, cottonseed oil, pumpkinseed oil, palm kernel oil and its fractions such as palm kernel olein and palm kernel stearin, grape seed oil, sesame oil, soy oil, cocoa butter, shea butter and the like.

Suitable fatty acids according to the present invention are $C_6$-$C_{24}$ fatty acids from vegetable and animal fats and oils such as those previously described, such as cotton, safflower, coconut, rapeseed, linseed, palm, palm kernel, sunflower, olein, olive, olive pomace, castor oil, tallow, soy, tall oil, etc, possibly totally or partially hydrogenated, as well as purified or synthetic fatty acids such as caproic acid, caprylic acid, capric acid, lauric acid, myristic acid, palmitic acid, palmitoleic acid, stearic acid, isostearic acid, 2-ethylhexanoic acid, oleic acid, ricinoleic acid, elaidic acid, petroselinic acid, linoleic acid, linolenic acid, arachidic acid, gadoleic acid, behenic acid and erucic acid, or mixtures thereof.

Fatty acids of the lauric, myristic, palmitic, palmitoleic, stearic, isostearic, 2-ethylhexanoic, oleic, ricinoleic, behenic type, or mixtures thereof are preferred.

The fact that there is $C_6$-$C_{24}$ fatty acid in the inert solvent (component (c)) in the compositions according to the invention does not have the drawback of the formation of amides. Said amides can be formed during prolonged storage periods, especially at high temperatures, of the anti-caking compositions, due to the condensation between said fatty acids or their esters and monoalkylamines (primary amines). The formation of amides can affect the anti-caking power of the compositions.

Suitable natural waxes according to the present invention are the candelilla wax, carnauba wax, Japan wax, esparto wax, cork wax, guaruma wax, rice wax, sugar cane wax, ouricury wax, montan wax, beeswax, shellac wax, espermaceti, wool lanolin (wax), uropygial fat wax, ceresin waxes, peat waxes, ozokerite, as well as chemically modified waxes (hard waxes) for example, montan wax esters, waxes obtained by the Fischer-Tropsch process, hydrogenated jojoba waxes and synthetic waxes.

Suitable polyols according to the present invention are preferably water-soluble polyols such as polyhydric alcohols with two or more hydroxyl groups in their molecule. Specific examples can include ethylene glycol, propylene glycol, 1,3-butylene glycol, 1,4-butylene glycol, dipropylene glycol, polyethylene glycol with average molecular weights by weight ranging between 100 and 1000, glucose, fructose, galactose, mannose, ribose, erythrose, maltose, maltitose, maltotriose, sucrose, xylitol, sorbitol, threitol, erythritol, glycerol, polyglycerol and starch alcohols. Especially preferred are polyols such as ethylene glycol, propylene glycol, 1,3-butylene glycol, 1,4-butylene glycol, dipropylene glycol, polyethylene glycol with average molecular weights by weight ranging between 100 and 1000, glycerol, polyglycerol, and mixtures thereof.

From the environmental point of view, animal and vegetable fats and oils, fatty acids, natural waxes and polyols, or mixtures thereof are preferred as inert solvent (component (c)) according to the invention, since the use of petroleum derivatives is thus avoided. Although for the person skilled in the art it is evident that, alternatively, animal and vegetable fats and oils, fatty acids, natural waxes and polyols can also be combined with mineral oils, paraffins and waxes from petroleum such that the resulting inert solvent (component (c)) has suitable properties from the environmental point of view (biodegradability, ecotoxicity, etc.)

Fatty acid triglycerides such as those previously described, $C_6$-$C_{24}$ fatty acids such as those previously described, or mixtures thereof are especially preferred as inert solvent.

In the event of using $C_6$-$C_{24}$ fatty acids as inert solvent, it is advantageous for the purposes of the present invention that the content of $C_6$-$C_{24}$ fatty acids is comprised between 3-100% by weight, preferably between 5-90% by weight, more preferably between 10-80% by weight, with respect to the total weight of the inert solvent (component (c)).

In addition, in the event of using mixtures of fatty acid triglyceride and free $C_6$-$C_{24}$ fatty acids, it is suitable according to the present invention that the fatty acid triglycerides and the $C_6$-$C_{24}$ fatty acids have different carbon chains.

The compositions object of the invention can be obtained by means of conventional process for mixing the different components, well known by the skilled person. Thus, for example, the different components can be mixed in molten state and, once the mixture has been homogenized, it is packaged and possibly cooled.

The compositions object of the present invention have, in relation to granular solid fertilizers, a broad field of application since they are effective both for simple fertilizers and for complex fertilizers. They are suitable for simple and complex fertilizers of the N, NP, NK, PK and NPK type, being especially preferable for complex fertilizers of the NPK type (such as 15.15.15, 17.17.17, 13.13.21 or 8.24.16), providing them with an efficient resistance against caking making said fertilizers show excellent properties with regard to their breakdown even after their transport and storage period. Said use also forms part of the present invention.

The compositions of the invention, in addition to fatty trialkylamines, occasionally contain fatty monoalkylamines of formula (IV)

wherein R represents a linear or branched alkyl, alkenyl or alkynyl group containing between 6 and 24 carbon atoms, preferably between 10 and 18 carbon atoms.

In the event of using as component (b) a mixture of fatty monoalkylamines of formula (IV) and fatty trialkylamines of formula (III), it is advantageous for the purposes of the present invention that the content of fatty trialkylamines of formula (III) is comprised between 20-80% by weight, preferably between 30-70% by weight, more preferably between 35-75% by weight, with respect to the total weight of said component (b).

In the event of using as component (b) a mixture of fatty monoalkylamines of formula (IV) and fatty trialkylamines of formula (III), despite the fact that it is possible for amides to be formed between the fatty monoalkylamines of formula (IV) and the fatty acids or their esters [in the form of component (c)], said phenomenon is surprisingly reduced maintaining the phosphoric ester [component (a)] in stoichiometric excess with respect to the fatty monoalkylamines of formula (IV) and completing the (partial or total) neutralization of the acidic proton or protons of the phosphoric ester with the fatty trialkylamines of formula (III).

The anti-caking compositions in which component (b) is a mixture of fatty monoalkylamines of formula (IV) and fatty trialkylamines of formula (III) are also suitable for preventing the caking of fertilizers in the form of granular solids, especially for fertilizers of the ammonium nitrate (AN) type. Said use also forms part of the present invention.

A process for obtaining fertilizers resistant to caking, wherein fertilizer granules are coated by applying on the surface a composition as it was previously described, also forms part of the object of the invention.

The processes for applying the compositions are well known by the skilled person and consist, for example, of applying the additive (compositions according to the invention) in molten state, by means of spraying techniques, on the surface of the fertilizer granules once such fertilizer has been manufactured.

The amount of additive to be applied on the fertilizer will depend on each case on the humidity, storage time and temperature conditions expected for the storage of the fertilizer, although good results can be obtained when said compositions are applied on the fertilizer in proportions comprised between 500 and 4000 ppm with respect to the weight of the fertilizer.

The following examples are set forth for the purpose of providing a sufficiently clear and complete explanation of the present invention to the person skilled in the art, but they must not be considered as limitations to the essential aspects of the object thereof as they have been set forth in the previous sections of this description.

EXAMPLES

Example 1

Preparation of the Additives of the Invention 1.1.—General Method

The inert solvent is loaded in a vessel provided with stirring at the necessary temperature for achieving a good flowability in the end product, maximum 90° C. The mass is maintained under stirring and the alkylamine in liquid state is added. The mass is maintained under stirring and the phosphoric ester in flakes or in liquid state is added, maintaining the same temperature. The mass is left under stirring for 30 minutes at the same temperature. Unloading and packaging are subsequently performed.

1.2.—Prepared Compositions

Compositions A, B, C, D, A', B', C' and D' (according to the invention) and the comparative examples (CE1, CE2, CE3, CE4) detailed in Tables 1 and 2, in which the amounts of the indicated components are expressed as parts by weight of each component added to each composition, were prepared following the general method. The amine was added according to the desired degree of neutralization (partial or total neutralization of the acidic protons of the phosphoric ester).

The melting point of said compositions was determined. To that end, a thermoanalytical technique called Differential Scanning Calorimetry (DSC) was used by means of a TA Instruments apparatus, model DSC 2010.

TABLE 1

Anti-caking compositions
Neutralization of the most acidic proton of the phosphoric ester

| Components | A | B | C | D | CE1 | CE2 |
|---|---|---|---|---|---|---|
| Stearylamine (mixture of $C_{16}$-$C_{18}$ monoalkylamine) | — | — | — | — | 5.5 | 5.5 |
| hydrogenated tallow methyldialkylamine | 10.0 | — | 10.0 | — | — | — |
| coconut methyldialkylamine | — | 8.5 | — | 8.5 | — | — |
| Paraffin oil (Extensoil ® 200, of Repsol YPF) | 80.0 | 81.5 | — | — | 84.5 | — |
| Crude rapeseed oil (Gustav Heess) | — | — | 80.0 | 81.5 | — | 84.5 |
| FOSFODET ® 80/50* | 10.0 | 10.0 | 10.0 | 10.0 | 10.0 | 10.0 |
| Melting point (° C.) [DSC (5° C./min)] | 76.6 | 57.2 | 82.9 | 59.8 | 93.4 | 97.4 |

*hydrogenated tallow phosphoric ester with a 60:40 molar ratio of monoester to diester

TABLE 2

Anti-caking compositions
Total neutralization of the phosphoric ester

| Components | A' | B' | C' | D' | CE3 | CE4 |
|---|---|---|---|---|---|---|
| Stearylamine | — | — | — | — | 8.8 | 8.8 |
| Hydrogenated tallow methyldialkylamine | 16.0 | — | 16.0 | — | — | — |
| Coconut methyldialkylamine | — | 13.8 | — | 13.8 | — | — |
| Paraffin oil (Extensoil ® 200, of Repsol YPF) | 74.0 | 76.2 | — | — | 81.2 | — |
| Crude rapeseed oil (Gustav Heess) | — | — | 74.0 | 76.2 | — | 81.2 |

TABLE 2-continued

Anti-caking compositions
Total neutralization of the phosphoric ester

| Components | A' | B' | C' | D' | CE3 | CE4 |
|---|---|---|---|---|---|---|
| FOSFODET ® 80/50* | 10.0 | 10.0 | 10.0 | 10.0 | 10.0 | 10.0 |
| Melting point (° C.) [DSC (5° C./min)] | 75.3 | 60.9 | 84.0 | 67.3 | 100.9 | 106.2 |

*hydrogenated tallow phosphoric ester with a 60:40 molar ratio of monoester to diester From the experimental data, it is evident that the anti-caking compositions according to the invention have a lower melting point than the compositions based on stearylamine, which allows using a lower energy amount in order to be applied on the fertilizers. This is observed with different types of inert solvents.

Example 2

Evaluation Method: Accelerated Caking Test

With the compositions described in Table 1 of Example 1, a (15.15.15) NPK complex granular fertilizer from the Huelva (Spain) factory of the company FERTIBERIA, S.A., was treated by means of spraying said molten compositions on the fertilizer, in a rotary mixer, at a dose of 1000 ppm with respect to the weight of the fertilizer (1 Kg/T).

Respective representative samples of fertilizer treated with the anti-caking compositions and of untreated fertilizer were subjected to an accelerated caking test consisting of introducing 90 g of fertilizer in cylindrical perforated metal test tubes with a height of 60 mm and a diameter of 45 mm, which can be longitudinally opened for extracting the samples, 3 test tubes being used for each sample of fertilizer. The samples were subjected to a pressure of 1.26 Kg/cm$^2$ in an INSTRON dynamometer, model 1011. The test tubes were maintained, at the previously indicated pressure, at a relative humidity (R.H.) of 80% and at a temperature of 20° C. for a period of 32 hours in a HERAEUS climatic chamber, model HC 2057. The climatic conditions were subsequently changed, passing to a R.H. of 20% and 40° C. for a period of 3 days.

Finally, the test tubes were left at environmental temperature and humidity and the agglomerated pieces were broken up, in the already indicated dynamometer, at a rate of 10 mm/minute.

The obtained result is expressed as the agglomeration average in percentage and if the agglomeration has been complete, also as the average resistance to break-up in kg.

The obtained results are shown in Table 3.

TABLE 3

Results of the caking tests

| Additive (Dosing: 1 kg/T) | % of agglomeration before break-up | Average resistance to break-up (kg) |
|---|---|---|
| A | 100.0 | 11.1 |
| B | 100.0 | 8.4 |
| C | 100.0 | 12.0 |
| D | 100.0 | 8.7 |
| CE1 | 100.0 | 12.0 |
| CE2 | 100.0 | 12.5 |
| Untreated blank | 100.0 | 34.6 |

From the obtained results, it is deduced that the compositions of the invention provide good results as anti-caking agents, in some cases even somewhat better than those obtained with the anti-caking additives based on stearylamine (CE1, CE2)

Example 3

Evaluation Method: Accelerated Caking Test

Other compositions according to the present invention were tested following the method described in Example 2, this time with the (26.0.0) NPK granular fertilizer from the Teruel (Spain) factory of the company GRUPO AGRIMARTIN, S.L. The test tubes were maintained, at the pressure indicated in Example 2, at a relative humidity (R.H.) of 60% and at a temperature of 20° C. for a period of 48 hours in a HERAEUS climatic chamber, model HC 2057. The climatic conditions were subsequently changed, passing to a R.H. of 20% and 40° C. for a period of 3 days.

In addition to some compositions already described in Examples 1 and 2, the compositions shown in Table 4 were tested.

TABLE 4

Anti-caking compositions
Neutralization of the most acidic proton of the phosphoric ester

| Components | E | F | G |
|---|---|---|---|
| Hydrogenated tallow methyldialkylamine | 10.0 | — | — |
| Coconut methyldialkylamine | — | 8.5 | 8.5 |
| Palm kernel/coconut fatty acids (Lípidos Santiga, SA) | 64 | 65.2 | — |
| RBD palm stearin (Lípidos Santiga, SA) | 16 | 16.3 | — |
| Refined palm oil (Lípidos Santiga, SA) | — | — | 81.5 |
| FOSFODET ® 80/50* | 10.0 | 10.0 | 10.0 |
| Melting point (° C.) DSC (5° C./min) | 58.3 | 49.3 | 60.5 |

*hydrogenated tallow phosphoric ester with a 60:40 molar ratio of monoester to diester The obtained result is expressed as the agglomeration average in percentage and if the agglomeration has been complete, also as the average resistance to break-up in kg.

The obtained results are shown in Table 5.

TABLE 5

Results of the caking tests

| Additive (Dosing: 1 kg/T) | % of agglomeration before break-up | Average resistance to break-up (kg) |
|---|---|---|
| C | 0.0 | — |
| D | 76.4 | — |
| E | 8.7 | — |
| F | 0.0 | — |
| G | 80.2 | — |
| CE1 | 58.2 | — |
| CE2 | 55.9 | — |
| Untreated blank | 100.0 | 33.1 |

From the obtained results, it is deduced, as in Example 2, that the compositions of the invention provide good results as anti-caking agents, in some cases even somewhat better than those obtained with the anti-caking additives based on stearylamine (CE1, CE2). Compositions C, E and F are especially preferred.

The modifications which do not affect, alter, change or modify the essential aspects of the described compositions are included within the scope of the present invention.

The invention claimed is:

1. A fertilizer composition comprising granular solids coated by a composition comprising a mixture which is composed, in the indicated amounts expressed as percentage by weight, of:
   a) 30-90% of at least one phosphoric ester, and
   b) 70-10% of at least one fatty trialkylamine,
wherein the at east one phosphoric ester is selected from the phosphoric esters of formula (I)

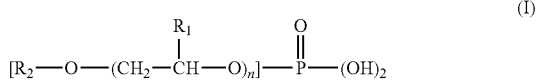

or of formula (II)

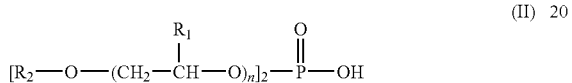

wherein,
$R_1$ represents H, $CH_3$ or $C_2H_5$,
$R_2$ represents a linear or branched alkyl, alkenyl or alkynyl group containing between 6 and 24 carbon atoms, and
n represents a number comprised between 0 and 15,
or mixtures thereof.

2. A fertilizer composition comprising granular solids coated by a coating composition comprising a mixture which is composed, in the indicated amounts expressed as percentage by weight, of:
   a) 30-90% of at least one phosphoric ester, and
   b) 70-10% of at least one fatty trialkylamine,
wherein the at least one phosphoric ester is selected from the phosphoric esters of formula (I)

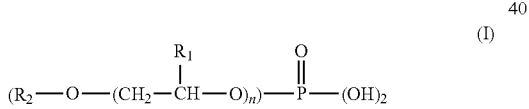

or of formula (II)

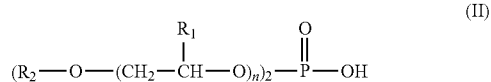

wherein,
$R_1$ represents H, $CH_3$ or $C_2H_5$,
$R_2$ represents a linear or branched alkyl, alkneyl or alkynyl group containing between 6 and 24 carbon atoms, and
n represents a number comprised between 0 and 15,
or mixtures thereof,
further comprising: fatty monoakylamines of formula (IV)

wherein R represents a linear or branched alkyl, alkenyl or alkynyl group containing between 6 and 24 carbon atoms.

3. The fertilizer composition according to claim 2, wherein the phosphoric ester is formed by a mixture of phosphoric esters of formula (I) and phosphoric esters of formula (II).

4. The fertilizer composition according to claim 3, wherein the molar ratio of phosphoric esters of formula (I) to phosphoric esters of formula (II) is between 90:10 and 30:70.

5. The fertilizer composition according to claim 4, wherein the mixture is composed, in the indicated amounts expressed as percentage by weight, of 50-80% of the at least one phosphoric ester, and 50-20% of a mixture of fatty monoalkylamines and fatty trialkylamines, wherein in the phosphoric esters of formula (I) and (II), n is between 0 and 10, and wherein the fatty trialkylamine has formula (III)

wherein
$R_1$ represents a linear or branched alkyl, alkenyl or alkynyl group containing between 6 and 24 carbon atoms,
$R_2$ represents a linear or branched alkyl group containing between 1 and 5 carbon atoms, and
$R_3$ represents a linear or branched alkyl group containing between 1 and 5 carbon atoms, or alkyl, alkenyl or alkynyl group containing between 6 and 24 carbon atoms.

6. The fertilizer composition according to claim 2, wherein the fatty trialkylamine is selected from fatty trialkylamines of formula (III)

wherein
$R_1$ represents a linear or branched alkyl, alkenyl or alkynyl group containing between 6 and 24 carbon atoms,
$R_2$ represents a linear or branched alkyl group containing between 1 and 5 carbon atoms, and
$R_3$ represents a linear or branched alkyl group containing between 1 and 5 carbon atoms, or alkyl, alkenyl or alkynyl group containing between 6 and 24 carbon atoms,
or mixtures thereof.

7. The fertilizer composition according to claim 6, wherein the fatty trialkylamine is selected from the group consisting of dimethyl octylamine, dimethyl decylamine, dimethyl laurylamine, dimethyl myristylamine, dimethyl palmitylamine, dimethyl cetylamine, dimethyl stearylamine, dimethyl behenylamine, coconut dimethylalkylamine, oleic dimethylalkylamine, tallow dimethylalkylamine, totally or partially hydrogenated tallow dimethylalkylamine, methyl dioctylamine, methyl didecylamine, methyl dilaurylamine, methyl dimyristylamine, methyl dipalmitylamine, methyl dicetylamine, methyl distearylamine, methyl dibehenylamine, coconut methyldialkylamine, oleic methyldialkylamine, tallow methyldialkylamine and totally or partially hydrogenated tallow methyldialkylamine, and mixtures thereof.

8. The fertilizer composition according to claim 2, wherein the mixture is composed, in the indicated amounts expressed as percentage by weight, of
   a) 50-80% of the at least one phosphoric ester, and
   b) 50-20% of the at least one fatty trialkylamine.

9. The fertilizer composition according to claim 2, wherein the coating composition further comprises an inert solvent in addition to the mixture.

10. The fertilizer composition according to claim 9, wherein the inert solvent is selected from the group consisting of mineral oils, paraffins and waxes from petroleum, animal and vegetable fats and oils, fatty acids, natural waxes and polyols, and mixtures thereof.

11. The fertilizer composition according to claim 9, comprising, in the indicated amounts expressed as percentage by weight with respect to the total weight of the coating composition, the mixture, and 60-98% of the inert solvent.

12. The fertilizer composition according to claim 2, wherein in the phosphoric esters of formula (I) and (II), n is between 0 and 10.

13. The fertilizer composition according to claim 2, wherein the at least one phosphoric ester is in an amount of 50-80% by weight.

14. The fertilizer composition according to claim 2, wherein the at least one fatty trialkylamine is in an amount of 50-20% by weight.

15. A composition for preventing the caking of fertilizers in the form of granular solids comprising a mixture which is composed, in the indicated amounts expressed as percentage by weight, of:
  a) 30-90% of at least one phosphoric ester, and
  b) 50-20% of at least one fatty trialkylamine,
wherein the at least one phosphoric ester is selected from the phosphoric esters of formula (I)

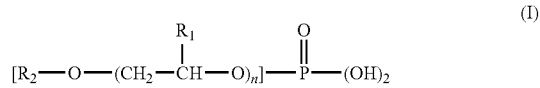

or of formula (II)

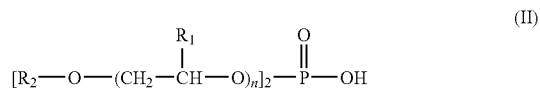

wherein,
$R_1$ represents H, $CH_3$ or $C_2H_5$,
$R_2$ represents a linear or branched alkyl, alkenyl or alkynyl group containing between 6 and 24 carbon atoms, and
n represents a number comprised between 0 and 15,
or mixtures thereof,
further comprising fatty monoalkylamines of formula (IV)

wherein R represents a linear or branched alkyl, alkenyl or alkynyl group containing between 6 and 24 carbon atoms, and further comprising a fertilizer composition in the form of granular solids.

\* \* \* \* \*